(12) United States Patent
Fallis et al.

(10) Patent No.: US 7,336,622 B1
(45) Date of Patent: Feb. 26, 2008

(54) METHOD AND SYSTEM FOR RESOLVING SWITCH NUMBER CONFLICTS IN A STACKABLE SWITCH SYSTEM

(75) Inventors: Brian W. Fallis, Campbell, CA (US); Prasad Rao, San Jose, CA (US)

(73) Assignee: Cisco Technology, Inc., San Jose, CA (US)

( * ) Notice: Subject to any disclaimer, the term of this patent is extended or adjusted under 35 U.S.C. 154(b) by 904 days.

(21) Appl. No.: 10/657,279

(22) Filed: Sep. 8, 2003

(51) Int. Cl.
*H04L 12/26* (2006.01)
(52) U.S. Cl. ...................... 370/252; 370/386
(58) Field of Classification Search ............... 370/241, 370/242, 244, 250, 252, 254, 256, 389, 386
See application file for complete search history.

(56) References Cited

U.S. PATENT DOCUMENTS

| | | | |
|---|---|---|---|
| 5,153,578 A | 10/1992 | Izawa et al. | 340/825.21 |
| 5,287,358 A | 2/1994 | Nakayama | 370/94.1 |
| 5,379,295 A | 1/1995 | Yonehara | 370/60 |
| 5,555,243 A | 9/1996 | Kakuma et al. | 370/58.2 |
| 5,764,624 A | 6/1998 | Endo et al. | 370/218 |
| 5,784,371 A | 7/1998 | Iwai | 370/397 |
| 5,805,817 A * | 9/1998 | Yu et al. | 709/224 |
| 6,031,838 A | 2/2000 | Okabe et al. | 370/395 |
| 6,075,767 A | 6/2000 | Sakamoto et al. | 370/228 |
| 6,118,782 A | 9/2000 | Dixon et al. | 370/389 |
| 6,373,843 B1 | 4/2002 | Lee | 370/395.1 |
| 6,490,276 B1 * | 12/2002 | Salett et al. | 370/360 |
| 7,145,864 B2 * | 12/2006 | Lee et al. | 370/216 |
| 2003/0147412 A1 * | 8/2003 | Weyman et al. | 370/419 |

\* cited by examiner

*Primary Examiner*—Brenda Pham
(74) *Attorney, Agent, or Firm*—Baker Botts L.L.P.

(57) ABSTRACT

A method for resolving switch number conflicts in a stackable switch system includes communicating a message between switches in the stackable switch system and determining, based on the communicated message, that two or more switches in the stackable switch system have the same switch number. The method also includes, in response to the determination that two or more switches have the same switch number, determining whether any of the switches should keep the switch number or select a new switch number.

29 Claims, 2 Drawing Sheets

METHOD AND SYSTEM FOR RESOLVING SWITCH NUMBER CONFLICTS IN A STACKABLE SWITCH SYSTEM

TECHNICAL FIELD OF THE INVENTION

This invention relates generally to communications systems and more particularly to a method and system for resolving switch number conflicts in a stackable switch system.

BACKGROUND OF THE INVENTION

Ethernet is a standard protocol for communicating information such as voice and data. Ethernet communications often involve one or more switches that receive communications and control retransmission to the appropriate destination. Often Ethernet communications involves a plurality of switches. Such switches may be coupled together in a chassis-based system. In a chassis-based system, a fixed chassis with slots for receiving individual switches is utilized. In such a chassis-based system, a number is assigned to each slot in the backplane in order to identify the placement of each blade or card in the backplane. Slot numbers are fixed and cannot be modified or assigned by the user of the switch.

An alternative switch system is a stackable switch system. Stackable switch systems utilize switches with identical or similar hardware configurations that can be stacked together by dedicated stacking interfaces. The stacking cables that connect the switches together can be thought of as a backplane where instead of hard-wired circuit boards with several slots to interconnect the different blades or cards of a chassis-based system, cables are connected to a stack interface on each of the switches in order to form the backplane. In such a stackable switch system, the "slots" are not fixed because the users of the switches have the ability to position the switches and any topology as they see fit.

The switches come with a factory default switch number and when these switches are stacked together, switch number conflicts may arise. Such conflicts may also arise when users remove switches from one stack and insert them into another stack where the switch number is already in use by another switch.

SUMMARY OF THE INVENTION

A method for resolving switch number conflicts in a stackable switch system includes communicating a message between switches in the stackable switch system and determining, based on the communicated message, that two or more switches in the stackable switch system have the same switch number. The method also includes, in response to the determination that two or more switches have the same switch number, determining whether any of the switches should keep the switch number or select a new switch number.

Embodiments of the invention may provide certain technical advantages. Some embodiments may realize some, none or all of these advantages. For each example, a method for resolving switch number conflicts is provided that does not require a switch reset in some instances. Further, the ability to reset switch numbers without losing configuration for the switch number may be achieved. In addition, the ability to replace a failed switch within a stack with a new switch and have the configuration of an old switch restored may be achieved. Further, no intervention is needed to resolve switch number conflicts.

Other technical advantages may be apparent to one skilled in the art from the following description, drawings, and claims.

BRIEF DESCRIPTION OF THE DRAWINGS

Reference is now made to the following description taken in conjunction with the accompanying drawings, wherein like reference numbers represent like parts, in which.

DETAILED DESCRIPTION OF THE INVENTION

Figure 1:
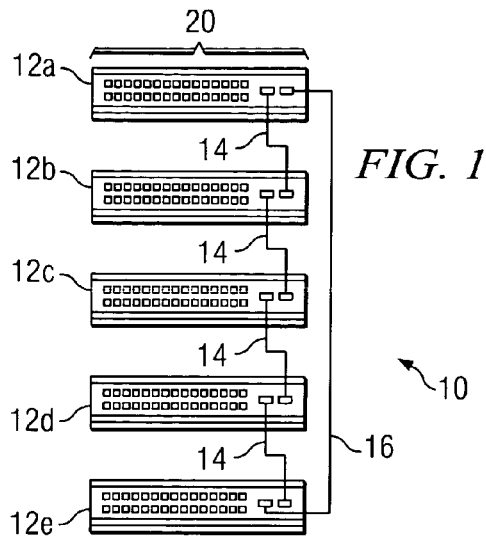
FIG. 1 is a schematic diagram illustrating a plurality of stackable switches.
Figure 2B:
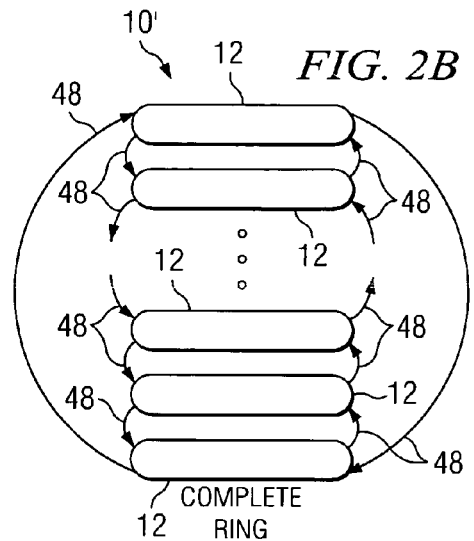
FIG. 2B is a block diagram illustrating coupling of the switches of FIG. 1 according to a first topology.
Figure 2A:
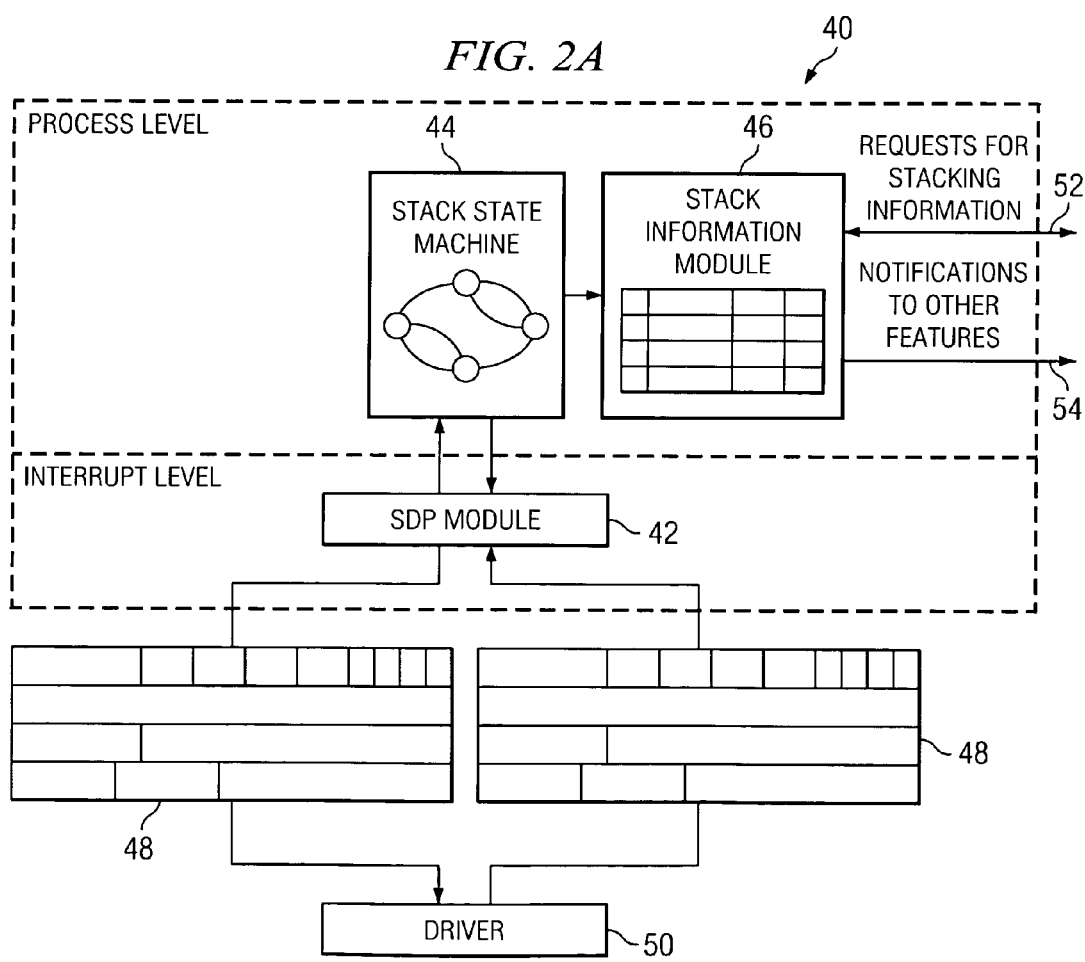
FIG. 2A is a block diagram illustrating a stack manager of the switches of FIG. 1.
Figure 2C:
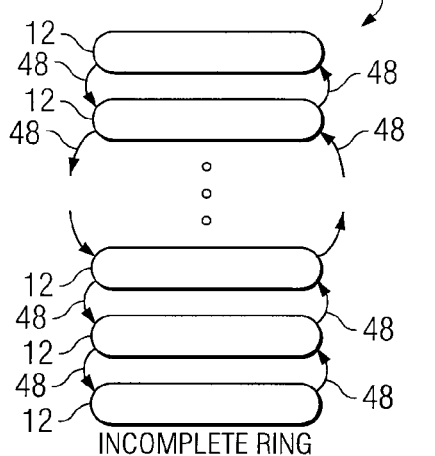
FIG. 2C is a schematic diagram illustrating coupling of the switches of FIG. 1 according to a second topology.
Figure 2D:
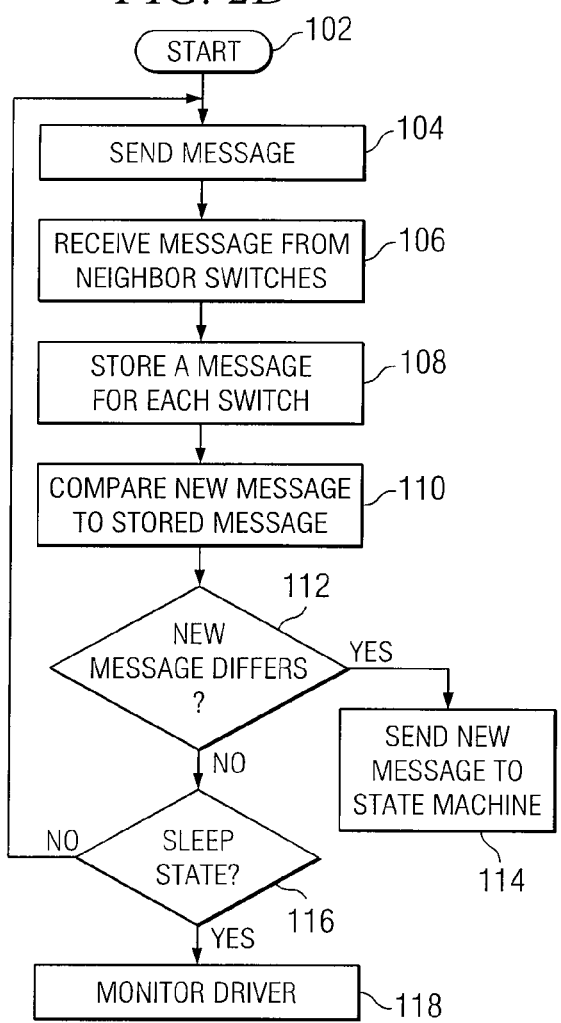
FIG. 2D is a flowchart showing example steps associated with sending and receiving stack messages.

Embodiments of the invention are best understood by referring to FIGS. 1 through 2D of the drawings, like numerals being used for like and corresponding parts of the various drawings.

FIG. 1 is a schematic diagram illustrating a stackable switch system 10 used for communicating information. Although the teachings of the invention are described in the context of Ethernet switches, they may apply to protocols other than Ethernet. Stackable switch system 10 includes a plurality of Ethernet switches 12. Switches 12 include switches 12a, 12b, 12c, 12d, and 12e. In this configuration, each switch 12 is coupled to its neighbors by lines 14. Thus, each switch 12 is directly coupled to its two neighbors. In this example, switches 12a and 12e, which are physically apart from each other, are considered neighbors because they are directly coupled together by a line 16.

Stackable switch system 10 may be originally configured with all five switches 12, as illustrated, or may be formed from a switch system having more or less switches. Conventionally, each switch 12 comes with a factory default switch number, used to identify the switch 12 for communication purposes. When switches 12 are coupled together, it may be the case that two or more switches have the same switch number. Because the switch numbers are used for identification of a particular switch 12 for routing purposes, conflicts in switch numbers must be resolved.

According to the teachings of the invention, switch number conflicts within stackable switch system 10 are resolved by first determining whether a switch number conflict exists and then, in response to such a determination, resolving the conflicts according to a plurality of preset rules. As described in greater detail below, switch number conflicts are determined by each switch 12 exchanging its switch number with its neighbors, and then its neighbors progressively passing this information along to their neighbor switches 12 to all switches 12 until each switch 12 knows the switch number of each other switch 12 in the stackable switch system 10. As described in greater detail below, in one embodiment, in addition to the switch number, switch 12 also exchanges with each switch 12 its unique identifier, such as a MAC address. This unique identifier may be used to identify which switch 12 is associated with each message 48 as well as to help resolve switch number conflicts. Then, if a conflict exists, switch numbers are modified. Additional details of the invention are described in greater detail below in conjunction with FIGS. 2A through 2D.

FIG. 2A is a block diagram of a stack manager 40 utilized to address switch number conflicts in stackable switch system 10. According to the teachings of the invention, each switch 12 in stackable switch system 10 includes a stack manager 40. In general, stack manager 40 performs functions associated with managing stackable switch system 10, including determining whether a switch number conflict exists in stackable switch system 10 and resolving any switch number conflicts.

Stack manager 40 includes a stack discovery protocol module 42, a stack state machine 44, and a stack information module 46. In general, stack discovery module 42 is responsible for sending and receiving stack messages 48 to and from other units in the stack and resolving any switch number conflicts. Stack messages 48 are received and transmitted through a driver 50. According to one embodiment, stack discovery protocol module 42 runs at an interrupt-level to send and receive messages. Stack discovery protocol module 42 passes information on to stack state machine 44, which runs at a process level, in one embodiment. Stack state machine 44 is responsible for analyzing stack messages 48 received from the stack discovery protocol module. Stack state machine 44 makes decisions based on the information received from all stack messages and also informs stack information module 46 of any changes to the information of all switches 12 in the stack 10.

Stack information module 46 has two primary responsibilities. Stack information module 46 processes requests for stack information from other components of the switch 12, as indicated by reference numeral 52. Also stack information module 46 is responsible for notifying other components of switch 12 of any changes to the stack, such as a new master switch, that a new switch has been added, that a new switch has been removed, etc., as indicated by reference numeral 54. According to one embodiment, stack information module 46 runs at the process level.

FIGS. 2B and 2C further illustrate the transmission of stack messages 48 to neighbor switches 12. In FIG. 2B, a complete ring topology for a stackable switch system 10' is illustrated. FIG. 2C illustrates an incomplete ring topology for a stackable switch system 10". As can be seen, in either topology each switch 12 may receive stack messages 48 from switches 12 that are not neighbors through its neighbors. In alternative embodiments, switches 12 may be arranged in other topologies and, in particular, topologies that allow direct delivery of stack messages 48 to switches other than neighbors.

According to one embodiment, stack discovery protocol module 42 sends a stack message 48 every 35 milliseconds; however, other suitable transmission schedules may be utilized. Stack discovery protocol module 42 checks for new messages every thirty-five milliseconds (in this example). Stack discovery protocol module 42 keeps a copy of the last message received for every switch 12 in stack 10. Stack discovery protocol module 42 compares every message received with the last message stored in the memory for any particular switch 12. If the messages differ, stack discovery protocol module 42 will pass the stack message 48 to stack state machine 44.

In general, according to one embodiment, this process begins by the stack discovery protocol module 42 sending out its own stack message, receiving the messages from other switches 12, and then sending out its own stack message again until it receives its original message back from one of its neighbor switches 12. This process continues until all switches 12 in stackable switch system 10 are in a ready state, at which point switches 12 no longer send out stack messages but instead go into a sleep state.

During the sleep state, stack manager 40 reads registers in driver 50 to determine if a switch 12 has been added or removed from stackable switch system 10. If such a condition occurs, stack manager 40 wakes up and begins sending out stack messages 48 again and the above process continues. This process is detailed in the flowchart of FIG. 2D.

FIG. 2D is a flowchart showing example steps associated with the above-described procedure of sending and receiving stack messages 48. Sending and receiving stack messages 48 by any given stack discovery protocol module 42 of any given state manager 40 begins at step 102. At step 104, stack discovery protocol module sends its own message to its neighbors. With reference to FIG. 1, switch 12a has neighbors 12b and 12e, and switch 12b has neighbors 12a and 12c. However, in other embodiments of the invention messages may be sent to only one neighbor or may be sent to switches that are not neighbors. According to one embodiment, switch 12 has knowledge of who its neighbor is by storing such information in a neighbor bit. At step 106, stack discovery protocol module 42 receives messages from neighboring switches 12, and at step 108 stack discovery protocol module 42 stores a message for each switch 12 in the stackable switch system 10. It should be noted that, in one embodiment, each message contains data associated with only one switch 12, and these messages are passed from neighbor to neighbor until each switch 12 has a message for each other switch 12 in the stack. The content of information contained in each stack message 48 is described in greater detail below.

At a step 110, as new messages 48 are received, the new message 48 for any given switch 12 is compared to the message 48 stored at step 108 for that switch 12 to determine if a change has occurred. If a change has occurred, as determined at step 112, then this new message is sent to stack state machine 44 at step 114. If the new message does not differ then a determination is made at step 116 of whether the switch should go into a sleep state. Determination of whether a switch should go into a sleep state is described in greater detail below in conjunction with stack state machine 44. If the state machine 40 goes into a sleep state then particular registers within driver 50 are monitored to determine if a switch has been added or removed from the stack. If such a condition occurs, stack manager 40 will wake up and begin sending out stack messages 48 again. If state machine 40 has not entered the sleep state at decision block 116, processing continues at step 104.

Although any suitable format for a stack message 48 may be utilized, in one embodiment each message includes a switch number for the associated switch, and a unique identifier for the switch, such as a MAC address. A MAC address is a Layer 2 Ethernet address that uniquely identifies each switch 12 regardless of its switch number. By including a MAC address in stack messages 48, there can always be a tiebreaker for determining which switch 12 may keep its switch number, because a lower or higher unique MAC address may be utilized in the decision criteria. In addition, the MAC address allows unique identification of the switch 12 that owns a stack message 48.

Other suitable information may also be included in message 48. For example, stack message 48 may include data indicating whether a switch 12 associated with message 48 is a master switch. The significance of a switch being a master switch is described in greater detail below. Stack message 48 may also include data indicating whether the switch associated with a stack message is a neighbor switch. Stack message 48 may also indicate whether the switch associated with the stack message is using a default configuration, or conversely whether it is using a custom configuration. Stack message 48 may also include data indicating the length of time the associated switch has been running, referred to as uptime. Stack message 48 may also include priority information indicating what priority a particular switch will be given in relation to switch number conflicts and determining whether a switch should become a master. Stack message 48 may also include a feature priority, indicating a more or less feature rich switch, as compared to others.

According to the teachings of the invention, by exchanging stack message 48, each individual switch 12 in stack 10 will determine whether a switch number conflict exists between it and any other switch 12 in the stack 10. If so, the switch 12 determines whether it may keep its switch number or whether it must select a new one. In one embodiment, this determination is made by stack discovery protocol module 42; however, other components of each switch could be used to make this determination. If a particular switch 12 determines that it must give up ownership of a switch number to another switch 12, it will look at its own internal table of used switch numbers to determine which switch numbers are available. This internal table is generated, as described above, through the reception and transmission of stack messages 48 by each switch's 12 stack discovery protocol module 42.

Once each switch 12 in stack 10 knows the switch number of all other switches 12 in stack 10, as determined as described above, each switch 12 determines whether it will keep its switch number or seek a new switch number according to predetermined rules. In one embodiment, these predetermined rules are based on characteristics of a switch that are stored in associated stack messages 48. The first of the criteria is whether the switch is a master switch. Each stack 10 contains one master and one or more slave units. The master is the central controller of the stack 10 in the entry point for management purposes. A master is elected at start-up time and remains the master until a new master election occurs. A new master election occurs when a master unit is reloaded or removed from the system, when the entire stack is reloaded, and when a stack is merged with another step.

According to one embodiment, the rules for determining whether a switch keeps its switch number or gives it up in view of a conflict are based on the following criteria, in order: (1) whether the switch is a master switch, (2) whether the switch has a higher user configurable priority than the conflicting switch; (3) whether the switch is not using the default configuration; (4) whether the switch has the higher feature priority; (5) whether the switch has the longer uptime; and (6) whether the switch has the lower MAC address. According to one embodiment, these criteria are assessed in order to determine whether a switch can keep its switch number or must attain a new switch number. Each criteria is individually tested, and if the individual test does not result in a winner, the next criteria is utilized. If a winner is achieved then the remaining criteria are not tested. Criteria other than that described above for determining whether a switch may keep its switch number and which switch is determined to be a master may also be utilized.

If a switch determines that it must give up its switch number, then it will assign itself the lowest available switch number for the stack 10. As described above, each switch stores a list of available stack numbers. The above process is repeated until it is determined each switch 12 has a unique switch number. It should be noted that the above process may result in two or more switches 12 both relinquishing their switch number and selecting the same new switch number, in which the case switch conflict resolution procedure continues until no conflicts exist.

Figure 2E:
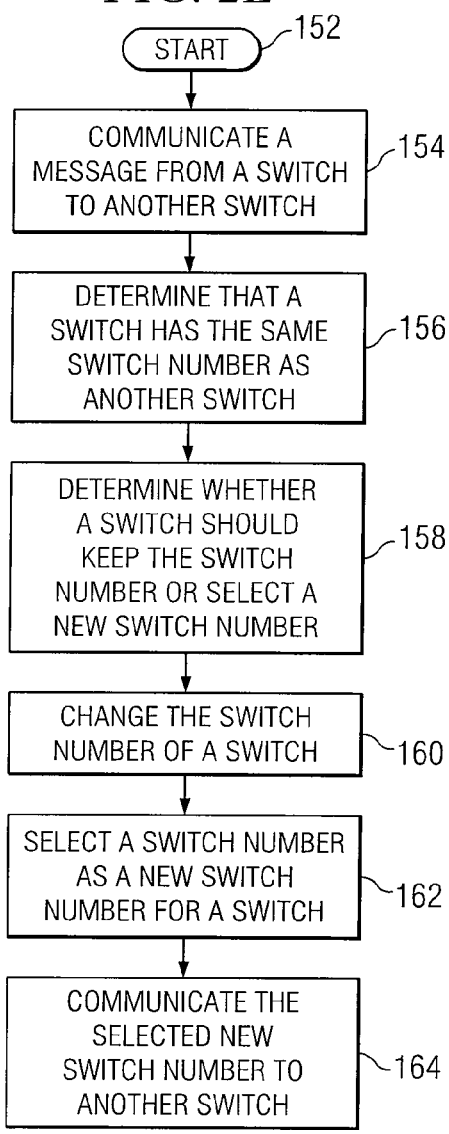
FIG. 2E is a flowchart showing example steps associated with one embodiment of resolving switch number conflicts in a stackable switch system.

FIG. 2E is a flowchart showing example steps associated with one embodiment of resolving switch number conflicts in a stackable switch system. Further details and embodiments of each of the example steps are described above. Resolving switch number conflicts in a stackable switch system beings at step 152. At step 154, a message is communicated from a switch to another switch. In one embodiment, the communication may include communicating a message from a first switch in the stackable switch system to a second switch in a stackable switch system. At step 156, a switch is determined to have the same switch number as another switch. In one embodiment, the determination may include determining, based on the communicated message, that the first switch in the stackable switch system has the same switch number as the second switch in the stackable switch system.

At step 158, whether a switch should keep the switch number or select a new switch number is determined. In one embodiment, the determination may include, in response to the determination that the first and second switches have the same switch number, determining whether the first switch should keep the switch number or select a new switch number. In a further embodiment, as described above, each switch 12 determines whether it will keep its switch number or seek a new switch number according to predetermined rules. At step 160, the switch number of a switch is changed. In one embodiment, the change may include changing, by the first switch, the switch number of the first switch. In another embodiment, the change may include changing, by the second switch, the switch number of the second switch. In a further embodiment, as described above, the process may result in two or more switches 12 both relinquishing their switch number and selecting the same new switch number, in which the case switch conflict resolution procedure continues until no conflicts exist.

At step 162, a switch number is selected as a new switch number for a switch. In one embodiment, the selection may include selecting, as a new switch number for the first switch, the lowest available switch number. At step 164, the selected new switch number is communicated to another switch. In one embodiment, the communication may include communicating the selected new switch number to the second switch.

Thus, a method and system for resolving switch number conflicts has been described that allows switch number resolution by identity switch number conflicts through passing stack messages and then resolving such conflicts according to predetermined rules. In one example these predetermined rules involve characteristics of a switch passed through stack messages 48. Such a system and method may provide, in some embodiments, certain technical advantages, although such advantages are not required. For example, a method for resolving switch number conflicts is provided that does not require a switch reset in some instances. Further, the ability to reset switch numbers without losing configuration for the switch number may be achieved. In addition, the ability to replace a failed switch within a stack with a new switch and have the configuration of an old switch restored may be achieved. Further, no intention is needed to resolve switch number conflicts.

Although some embodiments of the present invention have been described in detail, it should be understood that various changes, substitutions, and alterations can be made thereto without departing from the spirit and scope of the invention as defined by the appended claims.

What is claimed is:

1. A method for resolving switch number conflicts in a stackable switch system comprising:
   communicating a message from a first switch in the stackable switch system to a second switch in a stackable switch system;
   determining, based on the communicated message, that the first switch in the stackable switch system has the same switch number as the second switch in the stackable switch system; and
   in response to the determination that the first and second switches have the same switch number, determining whether the first switch should keep the switch number or select a new switch number.

2. The method of claim 1, wherein the message includes a switch number for the first switch and a unique identifier for the first switch, and wherein the determination of whether the first switch should keep the switch number or select a new switch number is based in part on the unique identifier.

3. The method of claim 1, wherein communicating a message from a first switch in the stackable switch system to a second switch in a stackable switch system comprises communicating the message through a plurality of additional switches in the stackable switch system disposed between the first and second switches.

4. The method of claim 1, and further comprising changing, by the first switch, the switch number of the first switch.

5. The method of claim 1, and further comprising changing, by the second switch, the switch number of the second switch.

6. The method of claim 1, wherein determining whether the first switch should keep the switch number or select a new switch number is based on a least one of the criteria selected from the group consisting of a predetermined priority for the switch, how long the switch has been running, a unique identifier for the switch, and whether the switch is utilizing a default configuration.

7. The method of claim 6, wherein the unique identifier is a MAC address.

8. The method of claim 1, wherein determining whether the first switch should keep the switch number or select a new switch number is based the following rules, in order:
   (a) the switch that is a master wins;
   (b) the switch having a greater user configurable priority wins;
   (c) the switch that is not using a default configuration wins;
   (d) the switch that has the higher feature priority wins;
   (e) the switch that has the longest uptime wins; and
   (f) the switch that has the lowest MAC address wins.

9. The method of claim 1, and further comprising selecting, as a new switch number for the first switch, the lowest available switch number.

10. The method of claim 1, and further comprising communicating the selected new switch number to the second switch.

11. A stackable switch system comprising:
    a plurality of switches each connected to at least one other switch in the stackable switch system, each switch comprising a stack manager that operates to:
    receive a communication from a second switch in the in the stackable switch system;
    determine, based on the communicated message, that the switch in the stackable switch system has the same switch number as the second switch; and
    in response to the determination that the switch and the second have the same switch number, determine whether the switch should keep the switch number or select a new switch number.

12. The system of claim 11, wherein the message includes a switch number for the switch and a unique identifier for the switch, and wherein the switch operates to determine whether the switch should keep the switch number or select a new switch number based in part on the unique identifier.

13. The system of claim 11, wherein the switch operates to receive the communication from a second switch through at least one other switch in the stackable switch system.

14. The system of claim 11, wherein the switch operates to change its switch number.

15. The system of claim 11, wherein the switch operates to determine whether the switch should keep the switch number or select a new switch number is based on a least one of the criteria selected from the group consisting of a predetermined priority for the switch, how long the switch has been running, a unique identifier for the switch, and whether the switch is utilizing a default configuration.

16. The system of claim 15, wherein the unique identifier is a MAC address.

17. The system of claim 11, wherein the switch operates to determine whether the switch should keep the switch number or select a new switch number based the following rules, in order:
    (a) the switch that is a master wins;
    (b) the switch having a greater user configurable priority wins;
    (c) the switch that is not using a default configuration wins;
    (d) the switch that has the higher feature priority wins;
    (e) the switch that has the longest uptime wins; and
    (f) the switch that has the lowest MAC address wins.

18. The method of claim 11, wherein the switch operates to select, as a new switch number, the lowest available switch number.

19. The system of claim 11, wherein the switch operates to communicate a selected new switch number to the second switch.

20. An Ethernet switch for use in a stackable switch system and for resolving switch number conflicts in the stackable switch system, the switch comprising a computer-readable medium storing a computer program that, when executed, operates to:
    receive a communication from a second switch in the in the stackable switch system;
    determine, based on the communicated message, that the switch in the stackable switch system has the same switch number as the second switch; and
    in response to the determination that the switch and the second have the same switch number, determine whether the switch should keep the switch number or select a new switch number.

21. The Ethernet switch of claim 20, wherein the message includes a switch number for the switch and a unique identifier for the switch, and wherein the program operates to determine whether the switch should keep the switch number or select a new switch number based in part on the unique identifier.

22. The Ethernet switch of claim 20, wherein the program operates to receive the communication from a second switch through at least one other switch in the stackable switch system.

23. The system of claim 20, wherein the switch operates to change its switch number.

24. The system of claim 20, wherein the program operates to determine whether the switch should keep the switch number or select a new switch number is based on a least one of the criteria selected from the group consisting of a predetermined priority for the switch, how long the switch has been running, a unique identifier for the switch, and whether the switch is utilizing a default configuration.

25. The switch of claim 20, wherein the unique identifier is a MAC address.

26. The system of claim 20, wherein the program operates to determine whether the switch should keep the switch number or select a new switch number based the following rules, in order:
   (a) the switch that is a master wins;
   (b) the switch having a greater user configurable priority wins;
   (c) the switch that is not using a default configuration wins;
   (d) the switch that has the higher feature priority wins;
   (e) the switch that has the longest uptime wins; and
   (f) the switch that has the lowest MAC address wins.

27. The method of claim 20, wherein the program operates to select, as a new switch number, the lowest available switch number.

28. The system of claim 20, wherein the program operates to select a selected new switch number to a second switch in the stackable switch system.

29. A system for resolving switch number conflicts in a stackable switch system comprising:
   means for communicating a message from a first switch in the stackable switch system to a second switch in a stackable switch system;
   means for determining, based on the communicated message, that the first switch in the stackable switch system has the same switch number as the second switch in the stackable switch system; and
   means in response to the determination means, for determining whether the first switch should keep the switch number or select a new switch number.

* * * * *